United States Patent
Brand et al.

(10) Patent No.: US 10,995,932 B1
(45) Date of Patent: May 4, 2021

(54) UNIFORM-IRRADIANCE EXTENDED-SOURCE FREEFORMS

(71) Applicant: Mitsubishi Electric Research Laboratories, Inc., Cambridge, MA (US)

(72) Inventors: Matthew Brand, Newton, MA (US); Daniel Birch, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 16/871,804

(22) Filed: May 11, 2020

(51) Int. Cl.
  *F21V 5/04* (2006.01)
  *F21V 7/00* (2006.01)
  *F21Y 115/10* (2016.01)

(52) U.S. Cl.
  CPC .................. *F21V 5/04* (2013.01); *F21V 7/00* (2013.01); *F21Y 2115/10* (2016.08)

(58) Field of Classification Search
  None
  See application file for complete search history.

(56) References Cited

U.S. PATENT DOCUMENTS

| | | | |
|---|---|---|---|
| 2004/0165391 A1* | 8/2004 | Blacker, Jr. | F21V 7/24 362/346 |
| 2013/0201561 A1* | 8/2013 | McCluney | G02B 19/0028 359/597 |
| 2018/0172238 A1* | 6/2018 | Camras | G02B 19/0061 |
| 2019/0162402 A1* | 5/2019 | Ji | F21V 7/005 |

* cited by examiner

Primary Examiner — Alan B Cariaso
(74) Attorney, Agent, or Firm — Gennadiy Vinokur; Hironori Tsukamoto (57) ABSTRACT

A lighting apparatus for providing uniform irradiance is provided. The lighting apparatus includes a light source configured to emit rays toward a polygonal target region, and a lens configured to uniformize irradiance from the light source to the target region, wherein sag of the lens and normals along a boundary of the lens are arranged so as to illuminate a perimeter of the target region based on an edge-ray mapping, wherein a lens surface is formed based on polyharmonic spline interpolations so as to smoothly illuminate an interior of the target region, wherein the irradiance is uniformized by argumenting light field tailoring of the lens, wherein the light field tailoring is augmented to maintain to maintain the irradiance perimeter.

14 Claims, 7 Drawing Sheets

UNIFORM-IRRADIANCE EXTENDED-SOURCE FREEFORMS

TECHNICAL FIELD

The present invention is generally related to an apparatus for uniform-irradiance extended-source freeform optics, and more specifically to an apparatus for uniformly irradiating an arbitrary convex polygon from a spatially extended light source.

BACKGROUND

Optical designers have long sought a class of lens and mirror shapes that can redistribute light from a spatially extended light source to illuminate a specified polygonal target region with high uniformity and minimal spill. There is need to develop how to produce such optics, ideally from a specification of perimeter polygons of the light source, optical surface, and irradiance target.

SUMMARY

Some embodiments of the present invention are based on recognition that a lighting apparatus for providing uniform-irradiance includes a spatially extended light source configured to emit rays toward a lens; a lens configured to redistribute radiance from the light source toward the target region, wherein the sag and normals along a boundary of the lens are arranged so as to illuminate a perimeter of the target region based on an edge-ray mapping, wherein a lens surface is formed based on polyharmonic spline interpolations so as to smoothly irradiate an interior of the target region, wherein the irradiance is then uniformized by light field tailoring of the lens surface, wherein the light field tailoring is augmented to maintain the irradiance perimeter.

Despite the apparent simplicity of the problem, tailoring freeform optics to uniformly irradiate polygonal regions from extended sources remains an area of active research. Early approaches ignored the geometry of the light source and numerically solved the Monge-Ampère problem (or equivalent formulation) to get the desired irradiance from a point light source located on or near the true source. This can be viable for low-étendue problems wherein the optic is impractically large relative to the light source, but, as disclosed below and as pointed in many technical articles, in high-étendue problems associated with more compact optics, an extended source significantly degrades both the uniformity and perimeter of the irradiance expected from a point-source-designed freeform. Heuristics for fixing this problem, such as deconvolution of the target, have had rather limited success, because the freeform variably magnifies and distorts the projected image of the light source. Degradation of the irradiance can be somewhat ameliorated in a feedback loop where the point-source target distribution is repeatedly modified to compensate for extended-source irradiance defects as revealed by Monte Carlo simulation. Unfortunately, published results indicate that significant nonuniformities and spills persist in the final irradiance.

In sum, for compact optics or larger sources, it is necessary to incorporate the geometry and radiance pattern of the extended source directly into the optimization problem. Almost all proposed methods that do so are specialized to highly symmetric problems. For example, for circular sources, freeforms, and targets, freeform tailoring can be treated as a 1D problem plus a correction for skew rays. A recent and intriguing SMS paper raises the possibility of generating two-surface freeforms directly from constraints on wavefronts from the corners of the source, but at time of writing there is no evidence that the method can deliver high uniformity or irradiate a target that is a different shape than that of the source.

The most general approach to extended-source freeform tailoring is to directly model the full irradiance field by integrating light arriving at each target point from all directions. This is an enormously expensive calculation, which can be approximated by backward ray tracing or by integrating flux through a thin cone or tube that connects a region of the lens to a region of the target plane. These calculations, which can be faster and more informative than forward Monte Carlo, set the stage for optimization. Völl et al. used small surface perturbations to estimate the gradient of the irradiance error with respect to the surface sag, but this method resulted in a highly noisy lens surface that did not yield high uniformity or low spill in the irradiance. On a more positive note, we found an algebraic relation between irradiance errors as revealed by backward ray tracing, and local surface curvature error. This makes it possible to tailor lenses and mirrors that produce nontrivial sharp-edged irradiance patterns even in very high-étendue settings, i.e., when light source subtends a large angle when viewed from any point on the exit surface of the optic.

It should be noted that for extended sources, the irradiance tailoring problem is often infeasible (exact solutions are usually physically impossible, even for simple patterns like uniform convex polygons) and methods based on iterative improvement can get stuck in local optima. Consequently, one seeks a high-quality approximate solution, and success depends on having a favorable initial surface.

Prior approaches for obtaining initial surfaces depend on obtaining a ray mapping from the entire optical surface to the projection plane and then solving for an optical surface that (approximately) yields the desired mapping. The ray mapping may be an arbitrary map or obtained via optimal transport.

We show that an edge ray mapping—a smooth 1-to-1 mapping from points on the lens boundary to points on the irradiance boundary—is sufficient to determine the entire solution. The edge ray mapping determines a spill-free freeform boundary; the rest of the initial surface can be obtained via interpolation and then irradiance-uniformized by curvature adjustments. We will present the method in three steps:

Determine sag and normals along the optical surface boundary to illuminate the polygon perimeter via edge ray mapping.

Interpolate the boundary to produce an optical surface that smoothly illuminates the polygon interior via polyharmonic splines, extended to differential constraints.

Uniformize the irradiance via light field tailoring, augmented to maintain the irradiance perimeter.

The advantages of this new approach are that it is fast, easily implemented, and produces sharp-edged illumination patterns (when physically possible). In § 3 we show high-quality results for a variety of regular and irregular convex polygons.

Some embodiments of the present invention provide a method to design a freeform optical surface that uniformly irradiates an arbitrary convex polygon from an extended light source. We show how to geometrically construct an initial edge ray mapping that routes maximally-angled rays from the edges of the source through the boundary of the optic to the boundary of the target polygon. This edge ray mapping determines the optic's boundary curve and normals, from which one can interpolate a minimum deformation energy surface that illuminates the target polygon. To uniformize this irradiance, we develop an extension of the light field tailoring algorithm that optimizes the spatial flux density while preserving its boundary. Highly uniform irradiances can be attained, even when the exit surface is less than three source diameters from the embedded source. In some special cases, sharp irradiance edges can be obtained as well.

Further, some embodiments of the present invention provides a lighting apparatus for providing uniform-irradiance to a target region. The lighting apparatus may include an extended light source configured to emit rays; a lens configured to receive and uniformize irradiance of the rays from the light source to the target region, wherein sag of the lens and normals along a boundary of the lens are arranged so as to illuminate a perimeter of the target region based on an edge-ray mapping, wherein a lens surface is interpolated from the boundary of the lens to illuminate an interior of the target region, wherein the lens surface is tailored so that light field of the rays thru the lens uniformly irradiates the interior and perimeter of the target region, wherein spill of the light field outside the perimeter of the target region is controlled.

BRIEF DESCRIPTIONS OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAIL DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

According some embodiments of the present invention, a lighting apparatus may include a light source, a lens, an electric circuit configured to supply power and control the light source and a housing. The housing is configured to arrange a power source (e.g. batteries), the electric circuit, the light source and the lens such that an optical axis of the light source and an optical axis of the lens are aligned.

In some cases, a number of the lighting apparatuses according to the present invention may be assembled to form a large area lighting apparatus or a league display. The housing, electric circuit, large area lighting apparatus not shown in figures).

2. Design Method

For simplicity of exposition, we consider an optical system comprised of a square Lambertian LED embedded in a lens illuminating a flat projection surface orthogonal to the optical axis. The lens will have a circular cross section and its exit surface will be tailored (i.e., the edge of the exit surface will lie on a cylinder). None of these assumptions are essential; the light source can have any geometry and radiance pattern, the lens can be polygonal, etc.

2.1 Determining the Optical Surface Boundary

First we determine sag and surface normals along the optical surface boundary, such that rays from the extended source refracted through the optical surface boundary will illuminate the target boundary without spill. This is feasible over most but not all of the target boundary, e.g., acute corners of a triangular target cannot be illuminated from a square source without spill, because the irradiance is a superposition of images of the source. It is, however, possible to guarantee a weaker condition: That the cone of light through any point on the optical surface boundary is touching and otherwise interior to at least one edge of the target boundary. In practice the interior guarantee can usually be upgraded to all edges.

The initial optical surface boundary is a simple ring of constant sag. Boundary design begins with a provisional mapping in which each point b on the optical surface boundary is assigned to a point t on the target irradiance boundary. Both boundaries are arc-length parameterized and put into correspondence by proportional arc-length.

Figures 1A, 1B:
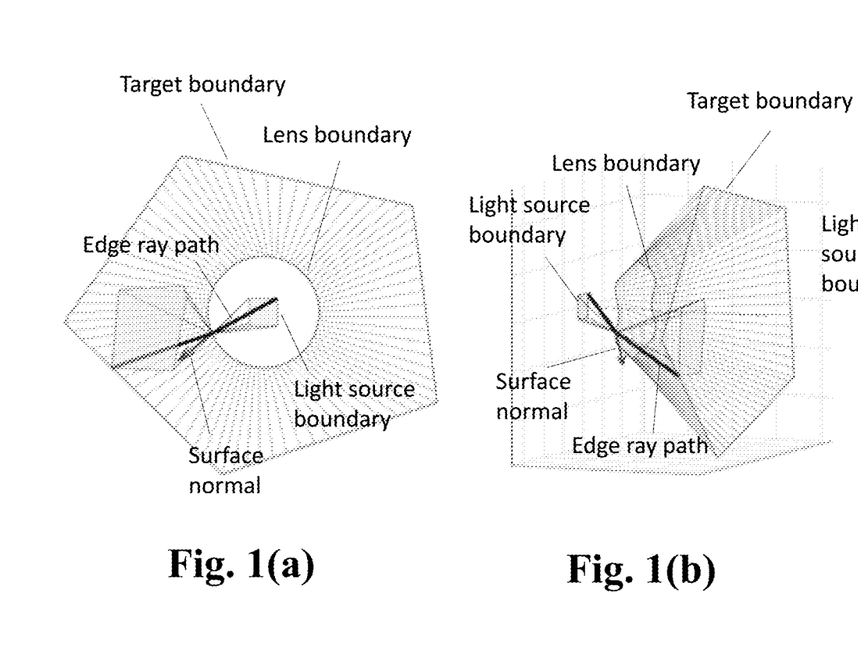
FIGS. 1(a)-1(c) are drawings illustrating the edge ray mapping in axial, ¾, and side views, according to embodiments of the present invention.
Figure 1C:
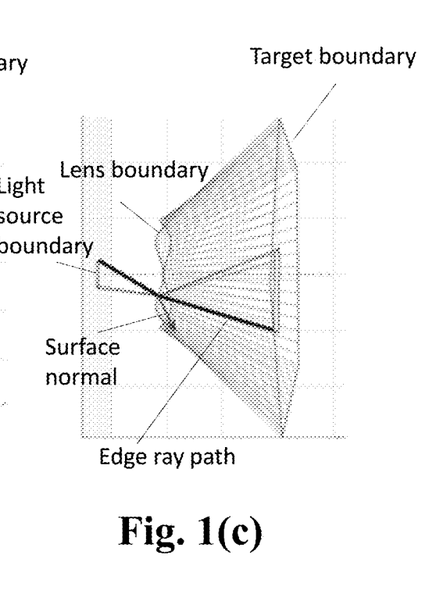

FIGS. 1(a)-1(c) show the edge ray mapping in axial, ¾, and side views, according to some embodiments of the present invention.

Each point on the lens boundary (circle) is put into correspondence with a point on the target boundary (irregular pentagon) and also with a farthest point on the light source boundary (central square) to determine an edge ray path (blue) and surface normal (magenta) that keeps the point-refracted image of the source (distorted square) on the correct side of that target boundary edge. Boundary sag and normals are then refined to be mutually consistent while preserving the mapping.

As can be seen in the left panel of FIG. 1, this concentrates energy toward the corners of the target. This provides a favorable initial condition for uniformization (§ 2.3) which will redistribute flux along the boundary and interior. We find this optimization is accelerated by further concentrating target points toward the polygon corners, e.g., if a target edge is arc-length parameterized −1≤x≤1, target points can be moved according to a sigmoid map such as x→λ(3x−x³)/2+(1−λ)x with best results around λ=½.

To incorporate light source geometry, each optic boundary point b is then assigned a source point s on the light source boundary, and s, t are adjusted to make b "spill-free", meaning that when the optic refracts a ray from s thru b to t on an edge of the irradiance target, all other extended-source rays refracted thru b will land on the irradiance-interior side of that edge. This can be accomplished in two steps: First, we pick a provisional source point s that is farthest from b on a circle circumscribing the light source, and calculate a provisional surface normal n at b that will bend a ray from s through b toward t according to the vector refraction law $$n \propto n\frac{b-s}{\|b-s\|} - \frac{t-b}{\|t-b\|}, \quad (1)$$

with n being ratio of refractive indices before and after b. Second, rays from vertices of the light source boundary are refracted through b and projected to the target plane, giving the convex hull of the projected source. These projections need to be shifted so that hull touches but does not cross that edge. To do so, the projected vertex that is least interior to the irradiance polygon w.r.t. the target edge is orthogonally projected onto that edge; the resulting point is denoted the new target point t, its source vertex is denoted the new source point s, and the normal n is recalculated. This shifts the projection of the source to the target edge but not along it.

Finally, all boundary sags and normals are jointly updated to be mutually consistent with each other and with their associated source and target points. This is accomplished by alternately solving for each normal n given its corresponding boundary point b as in in Eq. (1), and then for the sag components of all boundary points given all normals n, using the fact that boundary normals must be orthogonal to the boundary's azimuthal derivative:

$$n^T \frac{db}{d\theta} = 0, \quad \text{discretized as } \forall_i \, n_i^T(b_{i+1} - b_{i-1}) = 0 \quad (2)$$

to yield a linear system of equations for the sag component of discrete control points b, evenly spaced around the optical surface boundary. In the examples below (§ 3), alternating solutions of (1) and (2) typically converged in 2-4 iterations.

2.2 Determining the Optical Surface Interior

We then use polyharmonic splines to determine an optical surface from its boundary sag curve and normals. A polyharmonic spline f of order m minimizes the deformation energy $$U_m[f] = \int_{S \subset R^d} |\nabla^{2m} f|^2 dx, \quad (3)$$

on region S while interpolating some control points $\{(x_i, f(x_i))\}$. The m=1 case selects an minimum-variation surface and m=2 selects a minimum bending energy surface. Conveniently, eq. (3) is minimized with exact interpolation of control points by an affine combination of radial basis functions ψ (‖x−x_i‖):

$$f(x) = \sum_i \Psi(Px - x_i P)w_i + v^T x + c \text{ with } \Psi(r) B r^m \log(r)^{(m+l \bmod 2)}, \quad (4)$$

where the parameters $w_i$, v, and c are obtained by solving a system of linear equations, each an instance of (4) with x set to one control point $x_j$. We note that one can also control derivatives $f_x$, $f_y$, $f_{xx}$, $f_{yy}$, ⊠ at additional points by differentiating some of these equalities before solving the linear system. Splines of order m accommodate derivative constraints up to order m−1 and are optimally smooth w.r.t. the m th Laplacian off the control points.

Figure 2A:
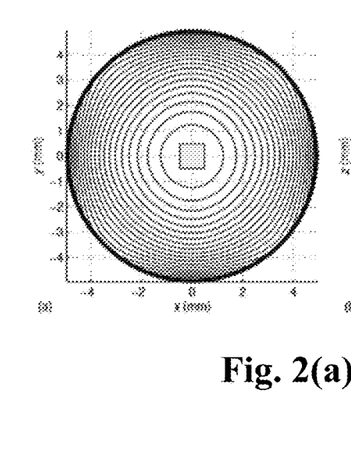
FIGS. 2(a)-2(d) show a polyharmonic lens surface providing a square irradiance boundary, according to embodiments of the present invention.
Figure 2B:
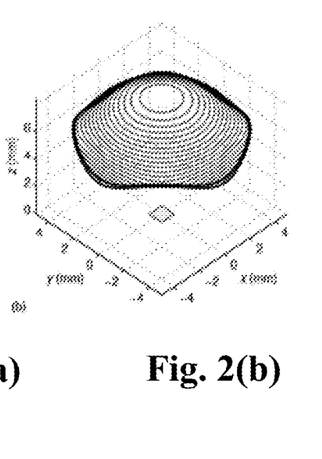

To obtain an initial optical surface with the desired edge ray mapping, we seek to interpolate the sag values f and surface gradients ∇f=($f_x$, $f_y$) at the lens boundary as determined in § 2.1, therefore we typically use the biharmonic (m=2) spline. FIGS. 2(a)-2(b) show a spline surface that smoothly but nonuniformly illuminates a square, yielding the irradiance pattern in FIG. 3(a).

Figure 2C:
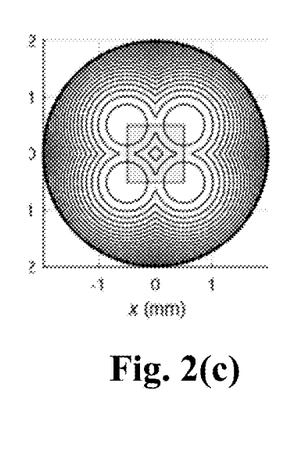
Figure 2D:
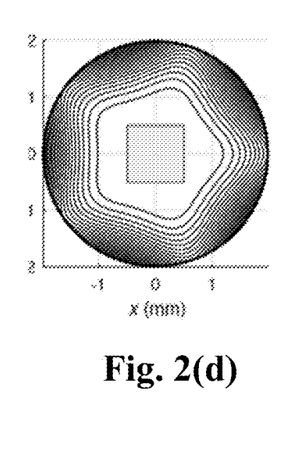

FIGS. 2(a)-2(c) show a polyharmonic lens surface providing a square irradiance boundary, according to some embodiments of the present invention. Control points (boundary), surface (contours), and led (square) in plan (left)

and axonometric view (center) views. At right, smaller lenses that produce the irradiances in FIG. 3(d) and FIG. 6.

It is also desirable (but not strictly necessary) that the interpolated surface does not produce any caustics (ray crossings) which might slow subsequent tailoring of the interior irradiance. The biharmonic solution is usually non-caustic, and a caustic-free surface can always be obtained as a linear combination of harmonic (m=1) and biharmonic splines. It is also possible to directly spline a "mostly uniform irradiance" freeform using triharmonic (m=3) interpolation with additional constraints that force some points on the interior of the surface to mimic the Laplacian curvatures $\nabla^2 f = f_{xx} + f_{yy}$ of a similar sized a sphere that uniformly irradiates a circular spot from a Lambertian point source (explicit sag function is known).

2.3 Uniformizing the Irradiance

Light field tailoring is then used to uniformize the irradiance provided by the splined surface. The general method is motivated by the observation that, locally, the curvature of the optical surface changes the curvature of the wavefront, thereby controlling beam dilations that dilute the intensity of the irradiance. Therefore a field of irradiance errors can be related to a field of curvature corrections g(x, y), which is then applied to the optical surface by solving a Poisson problem $\nabla^2 = g$ for a field of sag adjustments s(x, y). For zero-étendue (point) sources, the relationship is pointwise and direct. For positive-étendue sources (extended light sources and more generally light fields), the relationship is indirect but can be determined by solving a sparse linear system which reveals how credit for irradiance errors should be distributed over the curvature correction field. Both cases allow for fast parallel implementations and can tailor lenses and mirrors to produce uniform irradiance as well as photograph-like irradiance patterns. However, the irradiance only approximates the target, because most extended-source irradiance tailoring problems do not admit exact solutions. Of the many possible approximate solutions, light field tailoring prioritizes fidelity to the interior the target irradiance rather than the boundary, simply because the interior accounts for most of the flux. This turns out to be a liability for the polygonal irradiance problems contemplated here, where the quality of the boundary weighs more heavily in the desirability of the result. Consequently, the algorithm can be improved for this particular application.

Since the desired irradiance boundary is already provided by the boundary slopes of the polyharmonic spline, we modify the sag correction step to preserve this aspect of the optical surface geometry. To do so, we note that the solution of the Poisson problem $\nabla^2 s = g$ is not unique; one may add any saddle surface of the form $\tilde{s}(x,y) = a_1(x^2 - y^2) + a_2xy + a_3x + a_4y$ to s, because $\nabla^2(s+\tilde{s}) = \nabla^2 s + \nabla^2 \tilde{s} = \nabla^2 s + 0 = g$. On each iteration of curvature correction, we solve for coefficients $a_1$, $a_2$, $a_3$, $a_4$ of a saddle that cancels out unwanted boundary slope modifications, e.g., those that shift edge rays off the target perimeter. This is a small but overconstrained system of linear equations and so is solved in a minimum squared-error sense, Adding the saddle to the sag corrections effectively chooses, from a space of equivalent irradiance improvements, the one that least degrades the irradiance boundary.

Figure 3A:
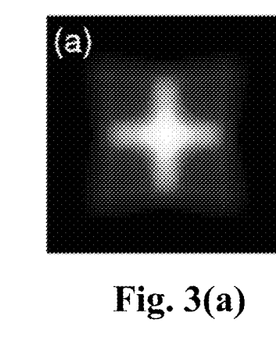
FIGS. 3(a)-3(e) show uniformization for a 1 mm² extended source, according to embodiments of the present invention.
Figure 3B:
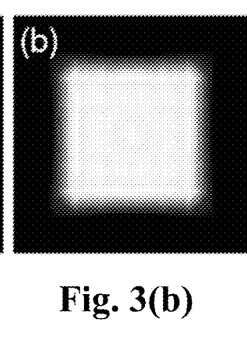
Figure 3C:
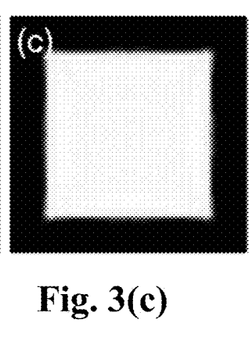
Figure 3D:
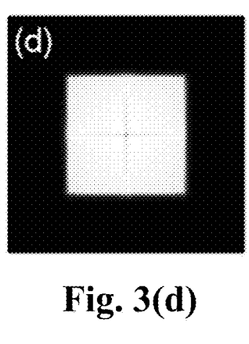
Figure 3E:
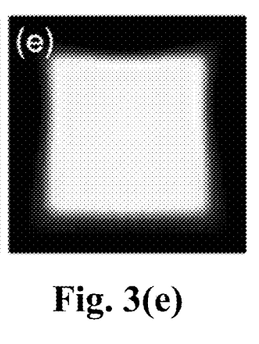

FIGS. 3(a)-(e) show uniformization w.r.t. a 1 mm² extended source, according to some embodiments of the present invention. FIG. 3(a) shows initial irradiance due to a polyharmonic spline lens surface (Ø=10 mm), FIG. 3(b) shows irradiance due to the final lens after light field uniformization (final vertex height=8.08 mm). Figure (c) shows sharper-edged irradiance attained with a larger (Ø=40.0 mm, v=28.1 mm, $S_{in}$=1770 mm, $S_{out}$=) lens. FIG. 3(d) shows sharp-edged irradiance due a very small (Ø=4.00 mm, v=5.16 mm) lens; target is the same size as 2×2 led images ($S_{in}$=720 mm, $S_{out}$=742 mm), FIG. 3(e) shows irradiance due to a lens designed for an oblique projection plane (Ø=10.0 mm, v=11.5 mm, $S_{in}$=1410 mm, $S_{out}$=1690 mm, and projection plane rotated 15.0☐ from orthogonal).

When tailoring for extended light sources, the designer faces a choice between a target with "hard" edges, which will force ringing artifacts due to the bandlimited source, or "soft" edges, which ameliorate the ringing but invite asymmetric fall-offs because some target edges may be better aligned with the edges of the light source than others. The trade-off becomes less severe with larger apertures, e.g., compare FIGS. 3(b)-3(c). There is one interesting exception to this trade-off: If the target irradiance can be approximated by tiling multiple focused images of the light source, then a union of Cartesian ovals whose focii form a grid on the projection plane serves as an excellent initial condition for light field tailoring. FIG. 3(d) shows the final irradiance, where the LED edges are multiply focused to form a sharp irradiance boundary. Note that because the tiled images are skew-projected off axis, they are radially distorted and cannot pack together neatly to provide a uniform interior. Unexpectedly, the optimization step uniformized the interior mainly by modifying the outer regions of the lens.

3 Examples

In this section we show several examples as a way of illustrating the trade-offs inherent in extended-source irradiance tailoring. Some example shapes of irradiances according to embodiments of the present invention are shown in the following. All examples are circular lenses with embedded sources, meaning there is a single refraction at the lens-air interface, where the index of refraction ratio is n=1.50. The sources are 1 mm square Lambertian LEDs and the distance from the source to the projection plane is 1200 mm in all cases. v is the source-vertex distance and the dimensions $S_{in}$ and $S_{out}$ are the side lengths of the uniform interior and of the entire illumination pattern, respectively.

Uniformity is scored as $u = 1 - \sigma/\mu$—one minus the coefficient of variation (also known as relative standard deviation) of the irradiance in the polygonal target region (where irradiance should be constant). Here $\sigma$ and $\mu$ are the standard deviation and mean of the irradiance.

Uniformity in the interior and sharp edges are the goals for all of the examples. With extended sources, there is always a trade-off between the two. In these examples we have allowed different amounts of roll-off at the edges to illustrate the trade-off.

Squares (FIG. 3): This standard test problem requires significant beam-shaping but the alignment of the led edges and the target edges makes the trade-off between uniformity and sharpness more favorable. We present a Ø=10.0 mm, vertex=8.08 mm lens that illuminates a square (uniform interior side length: 1030 mm, total side length: 1750 mm) with uniformity u=0.966 (FIG. 3(b)); a sharper-edged square illuminated by a larger Ø=40.0 mm, vertex=28.1 mm lens has interior side length 1770 mm, total side length 1980 mm, and uniformity 0.975 (FIG. 3(c)); and a very sharp-edged square due to a small Ø=4.00 mm, vertex=5.14 mm lens with a side length of 700 mm and uniformity 0.924 (FIG. 3(d)). As noted above, in this last case a sharp-edged solution is possible because the target is approximately an integer multiple of the focused spot size.

We also demonstrate an off-axis design in FIG. 3(e): For a Ø=10.0 mm lens illuminating a square with uniform interior side length=1410 mm and total side length=1690 mm on a projection plane with a tilt of β=15☐, this method yields a uniformity of 0.969. Note that the fall-off varies along the boundary because the spot size image of the led varies significantly.

FIGS. 4(a)-4(f) show targets with soft and hard edges, according to some embodiments of the present invention. In all cases the sources is a 1 mm square led, the source-projection plane distance is 1200 mm, and the index of refraction ratio is n=1.5. Top row: the irradiance due to the polygon-illuminating lenses described in § 3. Bottom row: the target and actual irradiance along the indicated transects through the polygons above. Hexagon (FIG. 4(a) & FIG. 4(d)): Ø=20.0 mm, v=14.0 mm, $S_{in}$=1000 mm, $S_{out}$=1200 mm. Pentagon (FIG. 4(b) & FIG. 4(e)): Ø=20.0 mm, v=17.0 mm, $S_{in}$=680 mm, $S_{out}$=1070 mm. Triangle (FIG. 4(c) & FIG. 4(f)): Ø=20.0 mm, v=15.9 mm, $S_{in}$=2400 mm, $S_{out}$=2500 mm.

Figure 4A:
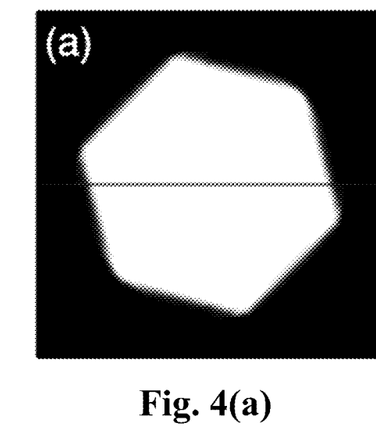
FIGS. 4(a)-4(c) show targets with soft and hard edges and FIGS. 4(d)-4(f) show plots of irradiant intensity along the horizontal midlines depicted in FIGS. 4(a)-4(c), according to embodiments of the present invention.
Figure 4B:
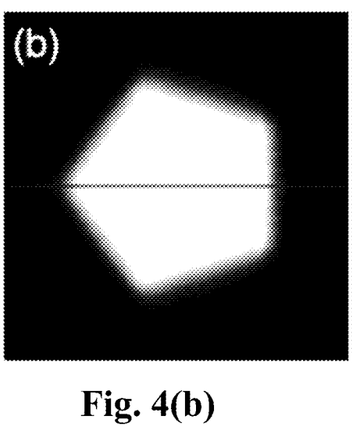
Figure 4C:
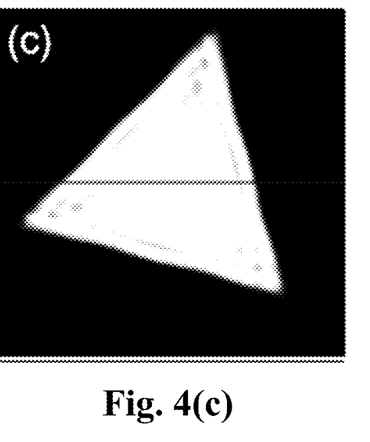
Figure 4D:
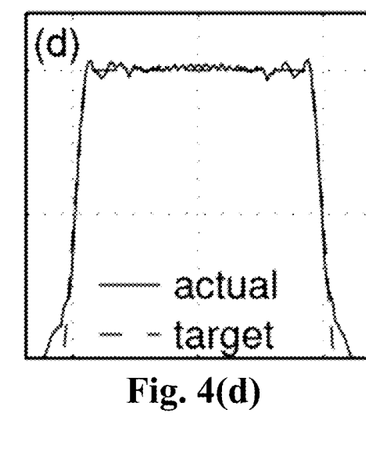

Hexagon (FIG. 4(a) & FIG. 4(d)): A Ø=20.0 mm, vertex=14.0 mm lens illuminates a hexagon with interior side length of 1000 mm (the total side length is 1200 mm). The target was designed with sharp edges, resulting in somewhat lower uniformity than would be possible for a soft-edged target: u=0.978 for the example shown. Note that because none of the edges are aligned with the LED edges, the fall-off varies between edges of different orientations and at the vertices.

Figure 4E:
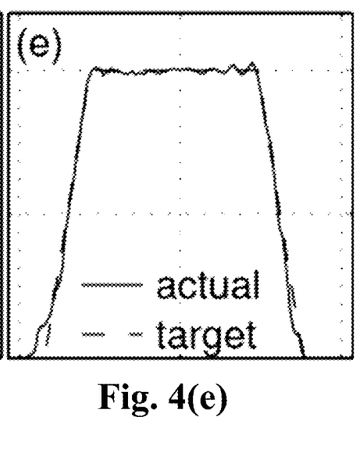

Pentagon (FIG. 4(b) & FIG. 4(e)): A pentagonal target requires less beam shaping than a square, but it is physically impossible to achieve hard edges that are not aligned with those of the light source. In FIG. 4(b), a Ø=20.0 mm, vertex=17.0 mm lens illuminates a pentagon with interior side length 680 mm (total side length 1070 mm) The target was designed with gentle roll-off of the edges, enabling extremely high uniformity in the interior: u=0.991.

Figure 4F:
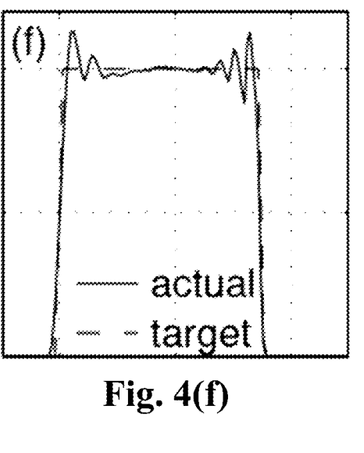
Figure 5A:
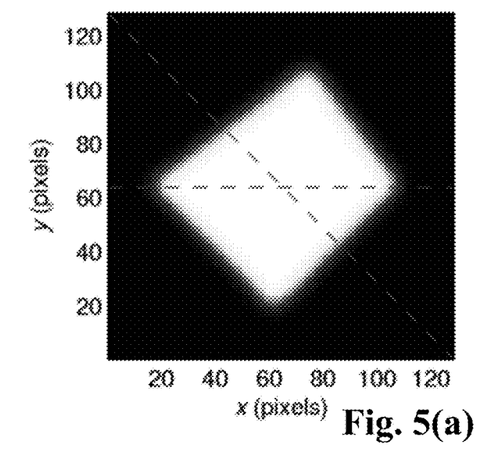
FIGS. 5(a)-(b) show irregular polygon for target and actual irradiance, according to embodiments of the present invention.
Figure 5B:
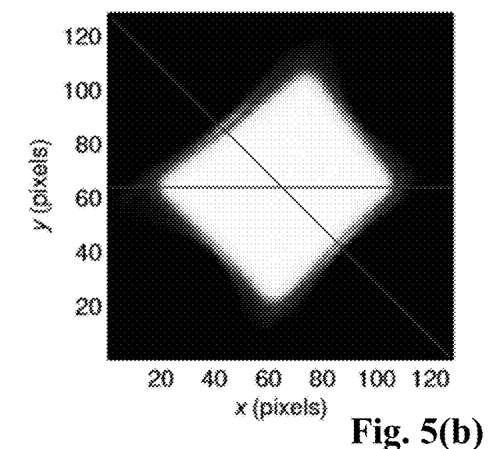
Figure 5C:
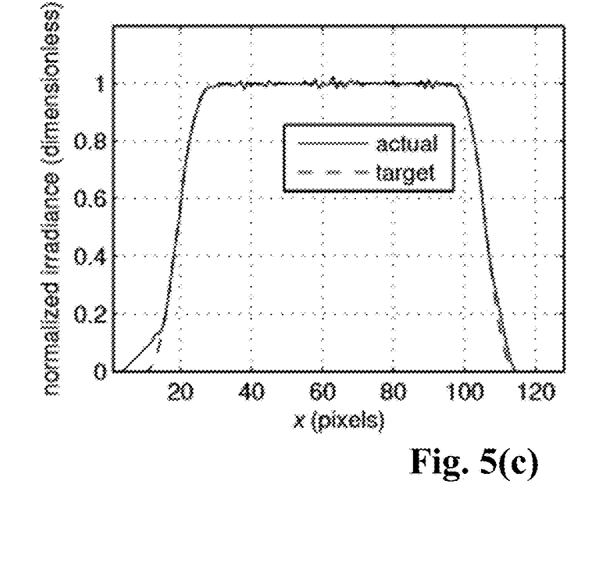
FIGS. 5(c)-5(d) show irradiance plots indicating horizontal and diagonal transects of FIGS. 5(a)-(b), according to embodiments of the present invention.
Figure 5D:
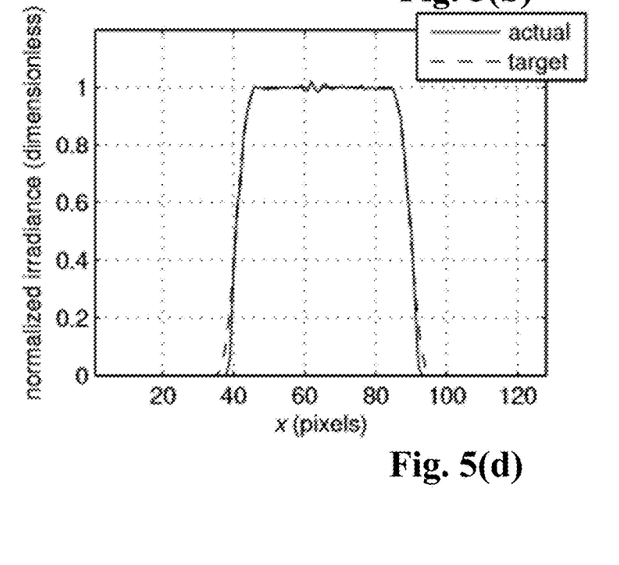

Triangle (FIG. 4(c) & FIG. 4(f)): Triangles are the most difficult polygons to illuminate with a circular freeform lens. Here we present an example of a Ø=20.0 mm, vertex=15.9 mm lens that illuminates an equilateral triangle with interior side length of 2400 mm (the total side length is 2500 mm) The hard edges of the target result in ringing and therefore lower uniformity in the interior: u=0.903 in this case.

Irregular polygon FIGS. 5(a)-5(d) show irregular polygon, according to some embodiments of the present invention. In this case, Ø=40.0 mm, v=25.2 mm, average $S_{in}$=1690 mm, and average $S_{out}$=3070 mm FIG. 5(a) indicates a target and FIG. 5(b) indicates actual irradiance, with irradiance plotting along the indicated FIG. 5(c) horizontal and FIG. 5(d) diagonal transects.

FIGS. 5(a)-5(d) show asymmetric polygons require more complicated light transport and slightly more care in setting up the boundary ray mapping, according to some embodiments of the present invention. To make the splining procedure equivalent to that used for regular polygons, we translate the target so that its centroid lies on the optical axis, then assign points from the lens boundary to the irradiance boundary on an arc-length basis before concentrating them near the vertices as before. For this example, we found that light-field tailoring converged significantly faster if the splined surface was first tailored for a point light source.

To tailor irregular-polygon-illuminating lenses we make the following modifications to the procedure: 1. Allocate an arc of the lens boundary to each edge of the target polygon proportional to the length of that edge; 2. Assign target points to the control points according to their assigned side, concentrating them near the vertices analogously to the regular-polygon case; 3. Uniformize for a point source before uniformizing for the extended source.

In this case, tailoring a Ø=40.0 mm diameter, vertex=25.2 mm circular lens to illuminate the irregular polygon with average inner radius of 950 mm and outer radius 1710 mm shown in FIG. 5 yielded a uniformity of 0.997.

Figure 6A:
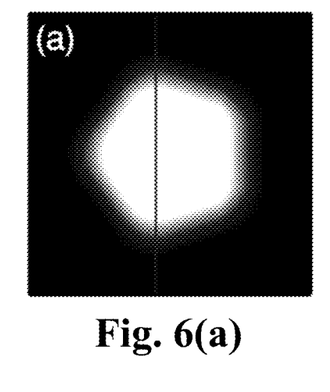
FIGS. 6(a)-6(b) show the uniformized irradiance due to a small indicating the entire irradiance pattern and transects along the indicated line before and after uniformization, according to embodiments of the present invention.
Figure 6B:
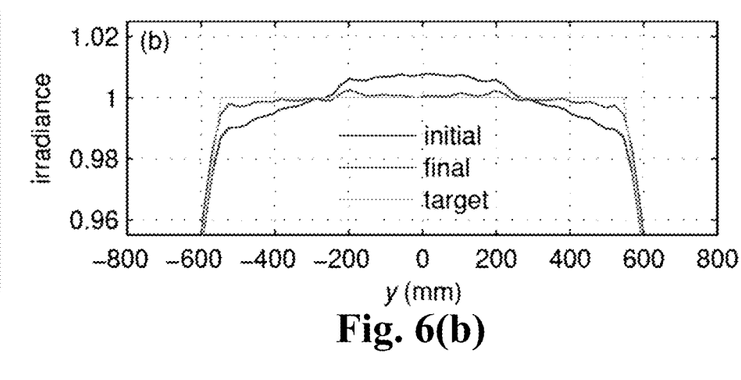

Very Small Lenses (FIG. 6(a), FIG. 6(b) & FIG. 3(d)):

FIGS. 6(a)-6(b) show the uniformized irradiance due to a small lens (Ø=4 mm, v=3.88 mm, $S_{in}$=726 mm, $S_{out}$=1800 mm). FIG. 6(a) indicates the entire irradiance pattern. FIG. 6(b) shows transects along the indicated line before and after uniformization.

A lens that is optimized to produce uniform irradiance for a point source may produce an approximately uniform irradiance with a relatively small extended source, but it will produce a distinctly non-uniform irradiance when the source is comparable in size to the lens. To illustrate, we first optimize a pentagon-producing lens to produce a u>0.999 uniform pentagon from a point source and then ray-trace from a led to find that the interior uniformity is substantially degraded (arched blue line in FIG. 6(b)). We then uniformize the irradiance via augmented light field tailoring algorithm as in all examples. Tailoring a Ø4.00 mm, vertex=3.88 mm lens for a 1.00 mm square led yields u=0.997.

Figure 7:
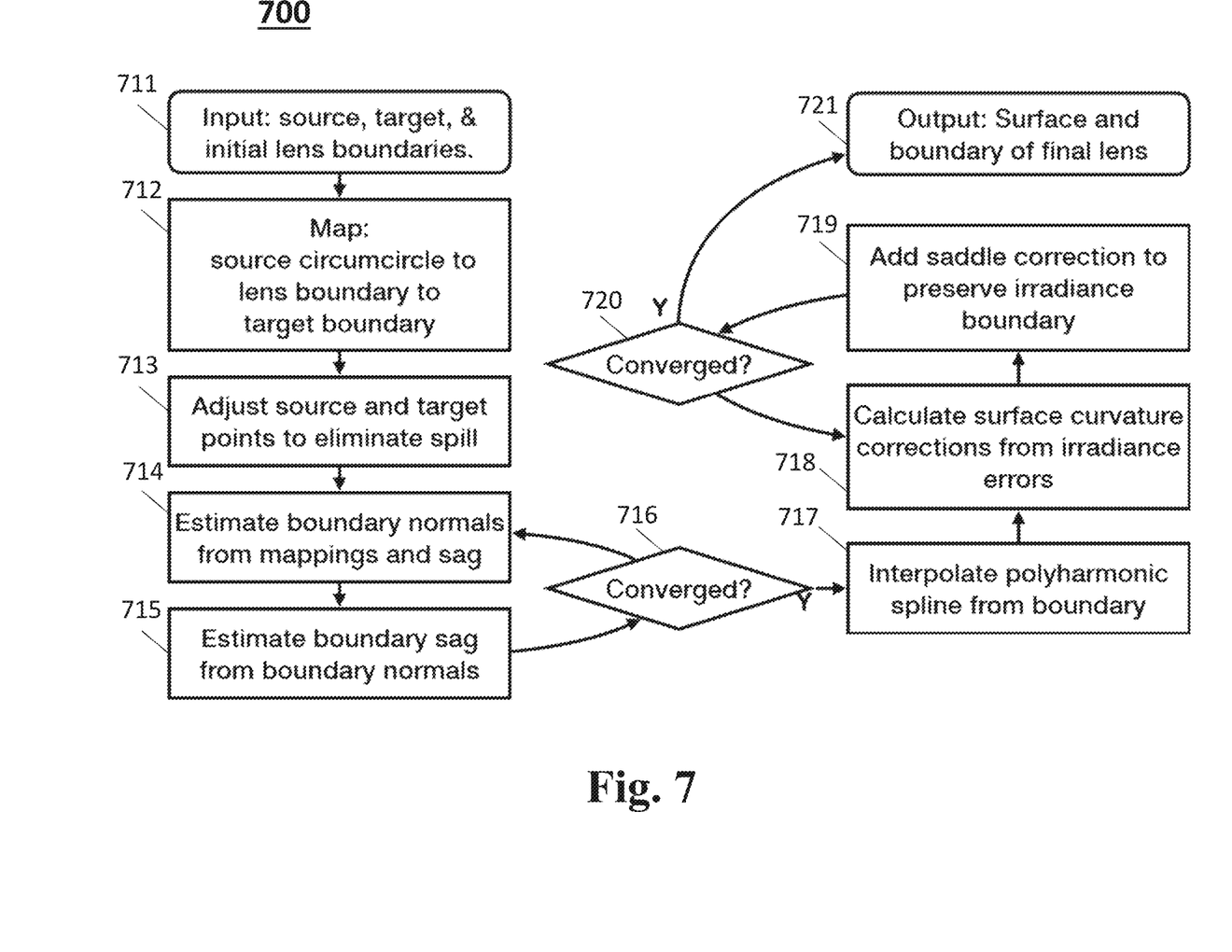
FIG. 7 shows a flow chart describing a method for designing an apparatus including uniform-irradiance extended-source freeforms, according to embodiments of the present invention.

FIG. 7 shows a flowchart indicating the tailoring process 700, according to some embodiments of the present invention. The tailoring process 700 includes the construction on the left hand and the optimization indicated on the right hand.

In step 711, a designer specifies the boundaries and locations of the light source, lens and target. E.g., the light source may be square, the lens may be circular, and the target may be an irregular convex polygon. In step 712 an initial edge ray mapping is made from the source circumcircle to the lens boundary to the target boundary. In step 713, the edge ray mapping source and target points are adjusted to eliminate spill. In step 714, boundary normals are estimated from the edge ray mapping of step 713 and an estimate of sag along the boundary, which is initially zero. Based on the estimation of the boundary normals, boundary sag is estimated in step 715. If steps 714 and 715 leave the sag and normal estimates unchanged, they are determined to be converted to a mutually consistent geometry in step 716. The steps of 714, 715 and 716 are iteratively performed until the results of 714 and 715 are determined to be converged. In step 717, a polyharmonic spline surface is interpolated from the consistent boundary sag and normals provided by 716. In step 718, calculations are performed for the surface curvature corrections from irradiance errors determined from backward ray tracing. A saddle correction is added to preserve the irradiance boundary in step 719. If the sum of the curvature corrections and the saddle correction results in a change to the lens surface, the surface is determined to be not converged in step 720. Steps 718, 719, and 720 are iteratively performed until the surface is determined to be converged. Then the surface and boundary of the lens is output as a final lens shape in step 721.

In the above, we have shown that an edge ray mapping suffices to determine a freeform lens that uniformly illuminates a target polygon from an extended light source. The key tools are surface interpolation and extended-source irradiance tailoring methods that preserve the edge ray mapping. We demonstrated several results with very high uniformity, including challenging problems such as targets with no symmetry, irradiance patterns with sharp edges, and lenses not much bigger than the light source. For every example above, the edge ray map and saddle correction provided faster convergence to a visibly better result than the generic light field tailoring algorithm.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A lighting apparatus for providing uniform-irradiance to a target region, comprising:
   an extended light source configured to emit rays;
   a lens configured to receive and uniformize irradiance of the rays from the light source to the target region, wherein sag of the lens and normals along a boundary of the lens are arranged so as to illuminate a perimeter of the target region based on an edge-ray mapping, wherein a lens surface is interpolated from the boundary of the lens to illuminate an interior of the target region, wherein the lens surface is tailored so that light field of the rays thru the lens uniformly irradiates the interior and perimeter of the target region, wherein spill of the light field outside the perimeter of the target region is controlled.

2. The lighting apparatus of claim 1, wherein the light source is embedded in the lens.

3. The lighting apparatus of claim 1, wherein the target region is represented by a convex polygon.

4. The lighting apparatus of claim 1, wherein the edge-ray mapping is performed such that rays from edges of the light source are routed through opposite edges of the lens and assigned to point on edges of the target region.

5. The lighting apparatus of claim 3, wherein the target polygon is a regular or irregular convex polygon deformed by a perspective transform.

6. The lighting apparatus of claim 1, wherein the light source is a light emitting diode (LED).

7. The lighting apparatus of claim 1, wherein the light source is the exit aperture of an arbitrary lighting apparatus.

8. The lighting apparatus of claim 1, wherein the tailored optical surface is a mirror instead of a lens.

9. The lighting apparatus of claim 1, wherein an emitting area of the light source is smaller than a surface area of the lens.

10. The lighting apparatus of claim 1, wherein the lens projects a polygonal region on a flat projection surface.

11. The lighting apparatus of claim 1, wherein the light source has a noncircular boundary.

12. The lighting apparatus of claim 1, further comprises an electrical circuit configured to supply an electric power to the light source such that the light source emits the rays of light.

13. The lighting apparatus of claim 1, further comprises a housing, wherein the housing is configured to hold the light source and the lens such that an optical axis of the light source and an optical axis of the lens are aligned.

14. The lighting apparatus of claim 1, wherein the lens is configured such that the rays from the light source are refracted through an optical surface boundary of the lens to illuminate a target boundary without spill.

* * * * *